(12) United States Patent
Cai

(10) Patent No.: US 12,253,761 B2
(45) Date of Patent: Mar. 18, 2025

(54) LIQUID CRYSTAL DISPLAY PANEL AND LIQUID CRYSTAL DISPLAY DEVICE INCLUDING THE SAME

(71) Applicant: Guangzhou China Star Optoelectronics Semiconductor Display Technology Co., LTD., Guangdong (CN)

(72) Inventor: Xueer Cai, Guangdong (CN)

(73) Assignee: Guangzhou China Star Optoelectronics Semiconductor Display Technology Co., LTD., Guangzhou (CN)

(*) Notice: Subject to any disclaimer, the term of this patent is extended or adjusted under 35 U.S.C. 154(b) by 0 days.

(21) Appl. No.: 18/228,131

(22) Filed: Jul. 31, 2023

(65) Prior Publication Data
US 2024/0377680 A1 Nov. 14, 2024

(30) Foreign Application Priority Data
May 12, 2023 (CN) .......................... 202310537782.1

(51) Int. Cl.
*G02F 1/1337* (2006.01)
*G02F 1/1333* (2006.01)
*G02F 1/1335* (2006.01)
*G02F 1/1343* (2006.01)

(52) U.S. Cl.
CPC .. *G02F 1/133769* (2021.01); *G02F 1/133354* (2021.01); *G02F 1/133368* (2021.01); *G02F 1/133388* (2021.01); *G02F 1/133514* (2013.01); *G02F 1/133707* (2013.01); *G02F 1/134318* (2021.01)

(58) Field of Classification Search
CPC ..................... G02F 1/133707; G02F 1/133371
See application file for complete search history.

(56) References Cited

U.S. PATENT DOCUMENTS

| 6,633,356 B1 | 10/2003 | Kataoka et al. | |
| 7,295,274 B1* | 11/2007 | Wu | G02F 1/1393 349/139 |
| 2005/0184939 A1* | 8/2005 | Ueda | G02F 1/133707 345/87 |

FOREIGN PATENT DOCUMENTS

| JP | 2000122065 A | * 4/2000 | |
| JP | 2002-107748 | 4/2002 | |
| JP | 2006-267882 | 10/2006 | |
| JP | 2006284787 A | * 10/2006 | G02F 1/133707 |

OTHER PUBLICATIONS

Notice of Refusal Dated Oct. 8, 2024 From the Japan Patent Office Re. Application No. 2023-202809 and Its Translation Into English. (8 Pages).

* cited by examiner

*Primary Examiner* — Jessica M Merlin

(57) ABSTRACT

A liquid crystal display panel includes an array substrate, a color filter substrate, and liquid crystal molecules. The array substrate includes a first alignment layer, and the color filter substrate includes a second alignment layer opposite to the first alignment layer. The liquid crystal display panel has a first region and a second region. In a film thickness direction, a sum of a thickness of the first alignment layer and a thickness of the second alignment layer in the first region is greater than a sum of a thickness of the first alignment layer and a thickness of the second alignment layer in the second region.

17 Claims, 2 Drawing Sheets

LIQUID CRYSTAL DISPLAY PANEL AND LIQUID CRYSTAL DISPLAY DEVICE INCLUDING THE SAME

RELATED APPLICATION

This application claims the benefit of priority of Chinese Patent Application No. 202310537782.1 filed on May 12, 2023, the contents of which are incorporated herein by reference in its entirety.

FIELD AND BACKGROUND OF THE INVENTION

The present disclosure relates to the field of display, and in particular, to a liquid crystal display panel and a liquid crystal display device including the same.

A liquid crystal display panel with a wide viewing angle often adopts the multi-domain vertical alignment technology. The design of multiple domains makes liquid crystals of the liquid crystal display panel in a static state have a deflection angle rather than being in an upright static state, which greatly shortens the penetration time. However, the design of the liquid crystals with multiple domains often leads to a low penetration rate of liquid crystal displays, resulting in image quality problems such as color deviation or whitening. Moreover, a slit end of a transparent electrode with a slit structure has a low light transmittance and low brightness, resulting in uneven display brightness.

Therefore, the liquid crystal display panel in the related art has the technical problem of poor uniformity of the display brightness.

SUMMARY OF THE INVENTION

Embodiments of the present disclosure provide a liquid crystal display panel having a first region and a second region. The liquid crystal display panel includes an array substrate, a color filter substrate, and liquid crystal molecules disposed between the array substrate and the color filter substrate. The array substrate includes a first substrate and a first alignment layer disposed on a side of the first substrate. The color filter substrate includes a second substrate and a second alignment layer disposed on a side of the second substrate facing the array substrate. The second alignment layer is disposed opposite to the first alignment layer. In a film thickness direction, a sum of a thickness of the first alignment layer and a thickness of the second alignment layer in the first region is greater than a sum of a thickness of the first alignment layer and a thickness of the second alignment layer in the second region.

Embodiments of the present disclosure further provide a liquid crystal display device, which includes the above-mentioned liquid crystal display panel.

BRIEF DESCRIPTION OF THE SEVERAL VIEWS OF THE DRAWINGS

In order to explain technical solutions in the embodiments of the present disclosure more clearly, the following will briefly introduce the drawings needed to be used in description of the embodiments. Apparently, the drawings in the following description are only some embodiments of the present disclosure. For those skilled in the art, other drawings can be obtained from these drawings without paying creative effort.

DESCRIPTION OF SPECIFIC EMBODIMENTS OF THE INVENTION

Figure 1:
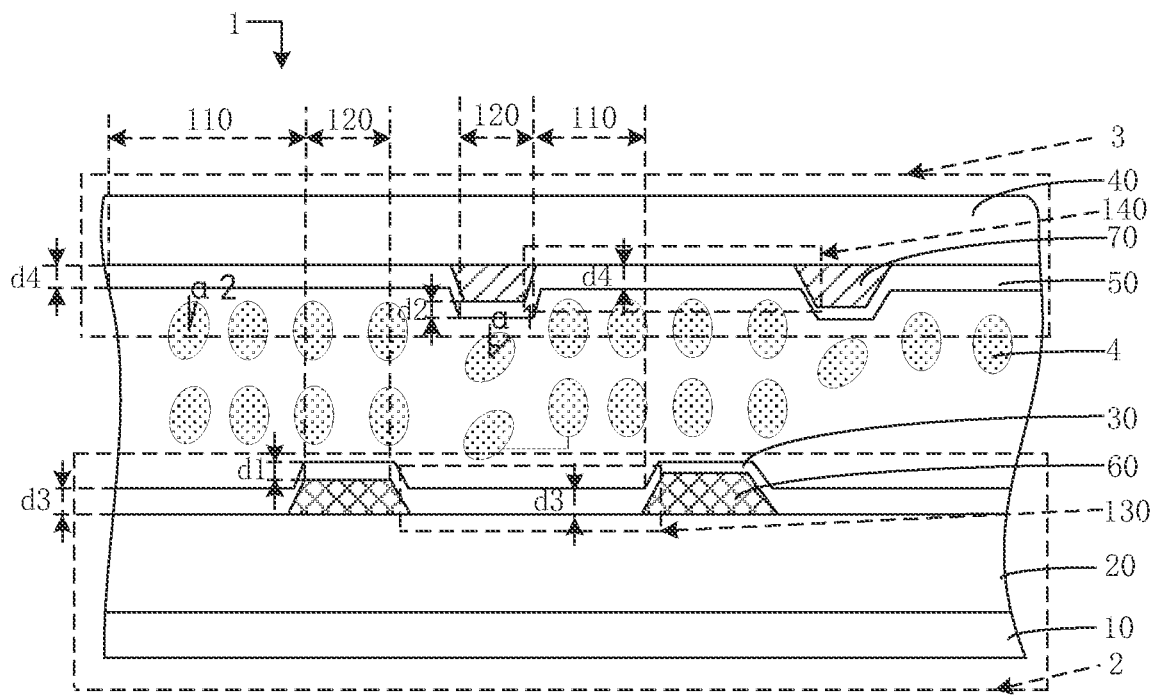
FIG. 1 is a first schematic cross-sectional diagram of a liquid crystal display panel according to one or more embodiments of the present disclosure.

In combination with drawings in embodiments of the present disclosure, technical solutions in the embodiments of the present disclosure will be described clearly and completely. Apparently, the described embodiments are only part of the embodiments of the present disclosure, not all of them. Based on the embodiments of the present disclosure, all other embodiments obtained by those skilled in the art without creative effort belong to a scope of the present disclosure. In addition, it should be understood that specific embodiments described herein are only used to explain and interpret the present disclosure and are not used to limit the present disclosure. In the present disclosure, location terms used, such as "up" and "down", generally refer to up and down in actual using or working state of devices, in particular drawing directions in the drawings, unless otherwise described; terms "inside" and "outside" refer to outlines of the devices.

Figure 2:
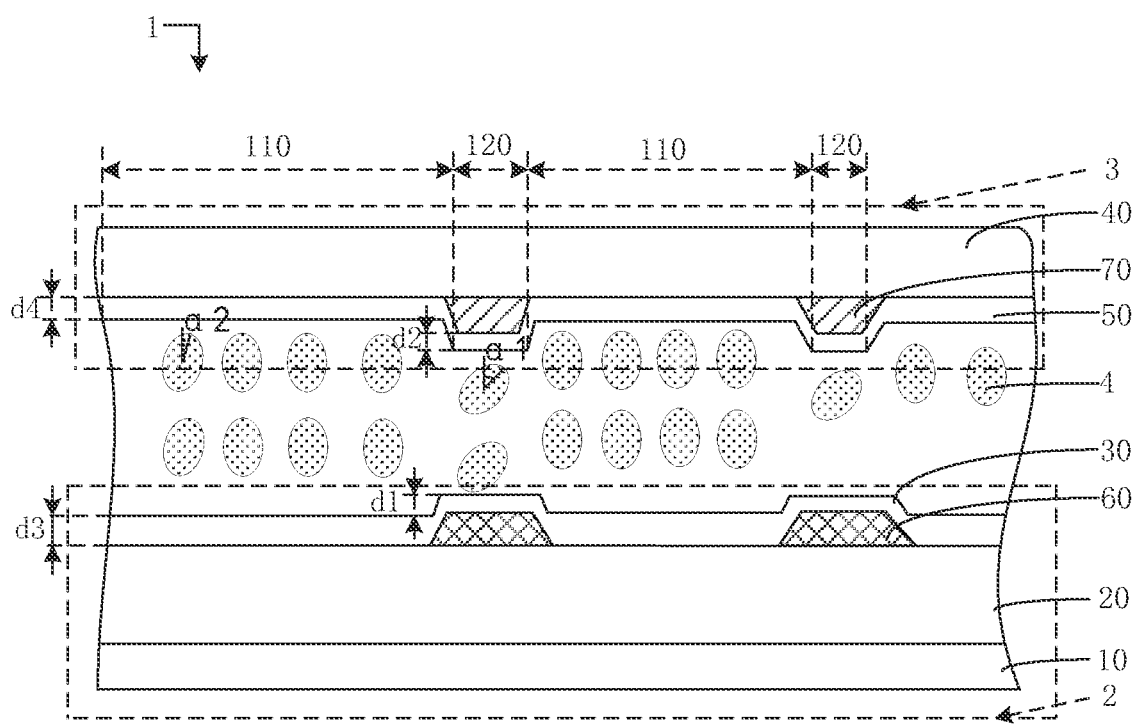
FIG. 2 is a second schematic cross-sectional diagram of a liquid crystal display panel according to one or more embodiments of the present disclosure.

Referring to FIG. 1 and FIG. 2, the liquid crystal display panel 1 according to some embodiments of the present disclosure includes an array substrate 2, a color filter substrate 3, and liquid crystal molecules 4 disposed between the array substrate 2 and the color filter substrate 3. The array substrate 2 includes a first substrate 10 and a first alignment layer 30 disposed on a side of first substrate 10 facing the color filter substrate 3. The color filter substrate 3 includes a second substrate 40 and a second alignment layer 50 disposed on a side of the second substrate 40 facing the array substrate 2. The first alignment layer 30 is disposed opposite to the second alignment layer 50. The liquid crystal display panel 1 has at least a first region and a second region. In a film thickness direction, a sum of a thickness of the first alignment layer 30 and a thickness of the second alignment layer 50 in the first region is greater than a sum of a thickness of the first alignment layer 30 and a thickness of the second alignment layer 50 in the second region.

In some embodiments, an initial light transmittance of the first region is greater than an initial light transmittance of the second region.

In some embodiments, a final light transmittance of the first region tends to be consistent with a final light transmittance of the second region.

It can be understood that because the initial light transmittance of the first region is greater than the initial light transmittance of the second region, on a condition that a backlight brightness in the first region and a backlight brightness in the second region are the same, there is a problem of uneven display brightness of the first region and the second region. The present disclosure makes the final light transmittance of the first region and the final light transmittance of the second region tend to be consistent by designing the sum of the thickness of the first alignment layer 30 and the thickness of the second alignment layer 50 in the first region being different from the sum of the thickness of the first alignment layer 30 and the thickness of the second alignment layer 50 in the second region, achieving the effect that the display brightness of the first region and the display brightness of the second region tend to be the same.

For the first region and the second region with different initial light transmittance, by designing the alignment layers with different thicknesses, specifically, by designing the sum of the thickness of the first alignment layer 30 and the thickness of the second alignment layer 50 in the first region with a high initial light transmittance being greater than the sum of the thickness of the first alignment layer 30 and the thickness of the second alignment layer 50 in the second region with a low initial light transmittance, this embodiment makes the final light transmittance of the first region tend to be consistent with the final light transmittance of the second region, so that the display brightness of different regions tends to be consistent, improving uniformity of the display brightness of the liquid crystal display panel in different regions.

Technical solutions of the present disclosure will be described in conjunction with specific embodiments.

The term "thickness of the alignment layers" mentioned in the following description refers to the sum of the thickness of the first alignment layer 30 and the thickness of the second alignment layer 50.

In some embodiments, the array substrate 2 further includes a pixel electrode layer 20 disposed between the first substrate 10 and the first alignment layer 30. The pixel electrode layer 20 is provided with multiple first protrusions 60 disposed at intervals. A first groove is formed between any adjacent two of the first protrusions 60. The thickness of the first alignment layer 30 at the first protrusions 60 is less than the thickness of the first alignment layer 30 at the first grooves.

In some embodiments, the thickness of the first alignment layer 30 at the first protrusions 60, the thickness of the first alignment layer 30 in the regions without disposing the first protrusions 60 and the first groove, and the thickness of the first alignment layer 30 at the first grooves increase sequentially.

In some embodiments, a material of the preparation of the first alignment layer 30 may be polyimide.

It can be understood that the first protrusions 60 are disposed in the array substrate 2, and the thickness of the first alignment layer 30 above the first protrusions 60 is less than the thickness of the first alignment layer 30 in other regions without disposing the first protrusions 60. The combination of the first protrusions 60, and the first alignment layer 30 disposed above the first protrusions 60 and with a smaller thickness can achieve the effect of improving the pixel penetration rate.

It can be understood that an uneven topography can be formed by designing the first protrusions 60 and the first grooves on a side of the pixel electrode layer 20 facing the color filter substrate 3. Because the material of the preparation of the first alignment layer 30 has fluidity, it will gather into the first grooves during the preparation process to form the first alignment layer 30 with a large thickness in the first groove, while the material of the preparation of the first alignment layer 30 flowing onto the first protrusions 60 will flow to other regions due to its fluidity and flatness, so as to form the first alignment layer 30 with a small thickness above the first protrusions 60.

This embodiment makes the first alignment layer 30 have different thicknesses in different regions by designing the first protrusions 60 and the first grooves to form the uneven topography in the array substrate 2, improving a final light transmittance of the regions with a low initial light transmittance, and making the final light transmittance of different regions equal, so that the display brightness of different regions tends to be consistent.

In some embodiments, the first protrusions 60 are correspondingly disposed in the second region 120, and the multiple first grooves are correspondingly disposed in the first region 110.

In some embodiments, the thickness of the second alignment layer 50 in the first region 110 can be equal to the thickness of the second alignment layer 50 in the second region 120.

It can be understood that due to the fact that the initial light transmittance of the second region 120 is low, the first alignment layer 30 with a small thickness needs to be designed to improve the display brightness of the second region 120, therefore, the first protrusions 60 can be disposed in the second region 120. Moreover, because the initial light transmittance of the first region 110 is high, the first alignment layer 30 with a large thickness needs to be designed to reduce the display brightness of the second region 120, therefore, the first grooves can be disposed in the first region 110. Based on the above, the present disclosure makes the display brightness of the first region 110 and the display brightness of the second region 120 tend to be consistent, further improving the uniformity of the display brightness of different regions.

It should be noted that the thickness of the first alignment layer 30 in this embodiment is mainly adjusted by designing the first protrusions 60 and the first grooves in the array substrate 2, so that the sums of the thicknesses of the first alignment layer 30 and the second alignment layer 50 in different regions are different.

In this embodiment, the first protrusions 60 are disposed in the second region 120 and the first grooves are disposed in the first region 110, so that the thickness of the first alignment layer 30 in the first region 110 is greater than the thickness of the first alignment layer 30 in the second region 120. By designing a thickness difference between the first alignment layer 30 in the first region 110 and the first alignment layer 30 in the second region 120, this embodiment can adjust the sums of the thicknesses of the first alignment layer 30 and the second alignment layer 50 in the first region 110 and the second region 120, respectively, so that the display brightness of the first region 110 and the display brightness of the second region 120 tend to be consistent, improving the uniformity of the display brightness of different regions.

In some embodiments, a material of the preparation of the first protrusions 60 may be a non-metallic transparent material, such as photoresist and/or silicon nitride.

In some embodiments, at least one side surface of the first alignment layer 30 and/or at least one side surface of the second alignment layer 50 is an uneven surface.

In some embodiments, the first protrusions 60 are integrated with the pixel electrode layer 20.

In some embodiments, the material of the preparation of the first protrusions 60 and a material of the preparation of the pixel electrode layer 20 are the same.

In some embodiments, the material of the preparation of the pixel electrode layer 20 may include at least one of indium tin oxide, indium gallium zinc oxide, and indium zinc oxide.

It can be understood that the first protrusions 60 can be integrated with the pixel electrode layer 20, and the first protrusions 60 can be prepared by the same photomask as the pixel electrode layer 20. Because the preparation of the first protrusions 60 does not require an additional photomask, the present disclosure can save the photomask used for preparing the first protrusions 60.

In this embodiment, the first protrusions 60 are integrated with the pixel electrode layer 20. In terms of the process, the first protrusions 60 and the pixel electrode layer 20 can be prepared by using the same photomask, which does not require additional photomask for preparing the first protrusions 60, saving one photomask and reducing the cost.

Figure 3:
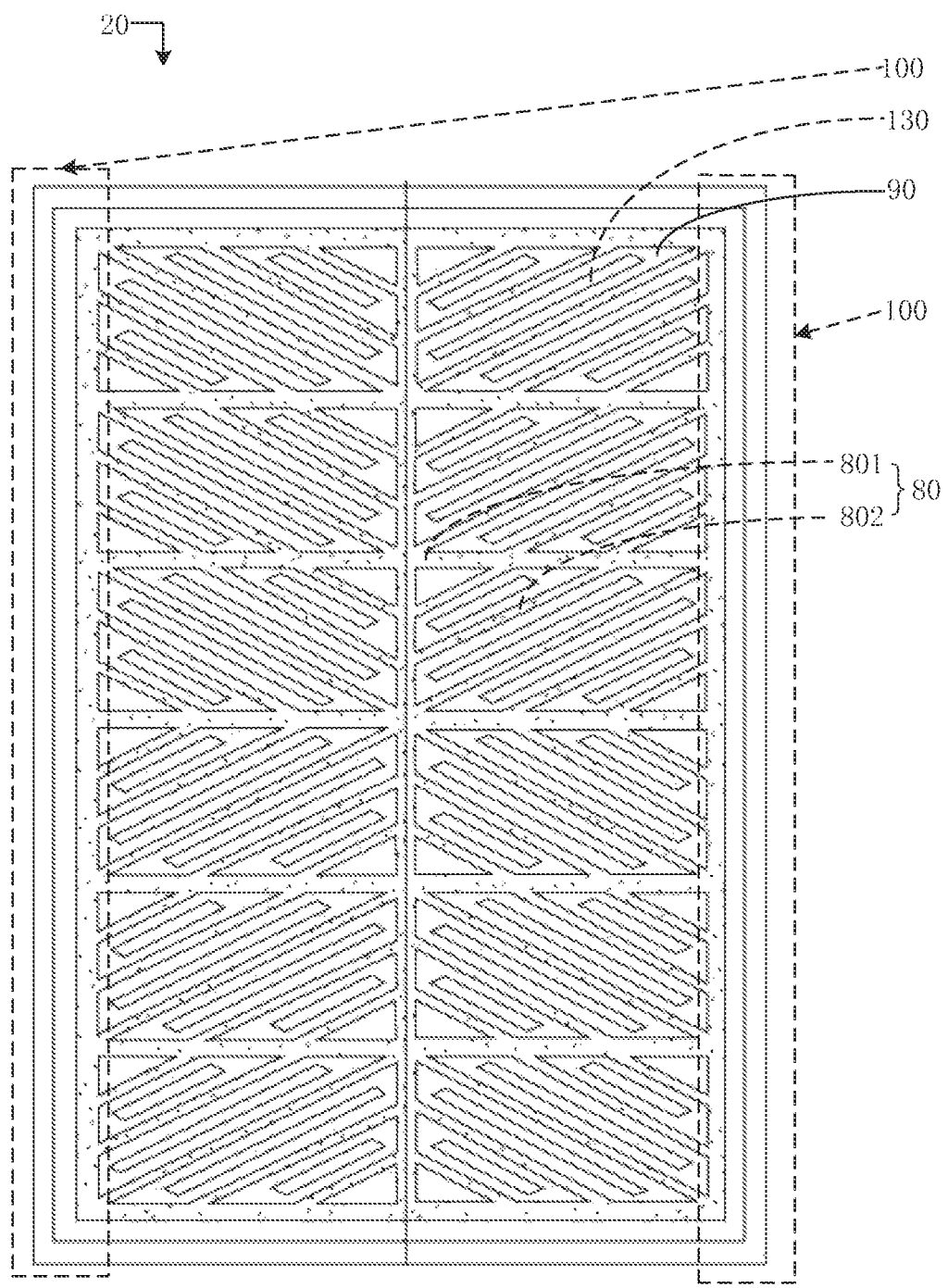
FIG. 3 is a schematic cross-sectional diagram of a pixel electrode layer in a liquid crystal display panel according to one or more embodiments of the present disclosure.

Referring to FIG. 3, in some embodiments, the pixel electrode layer 20 includes multiple pixel electrodes. Each of the pixel electrodes includes a body portion 80 and a slit portion 90 disposed in the body portion 80, and a slit end 100 disposed at an edge of the body portion 80 and an edge of the slit portion 90. A sum of thicknesses of the first alignment layer 30 and the second alignment layer 50 at the slit end 100, a sum of thicknesses of the first alignment layer 30 and the second alignment layer 50 at the body portion 80, and a sum of thicknesses of the first alignment layer 30 and the second alignment layer 50 at the slit portion 90 increase sequentially.

In some embodiments, the slit end 100 at the edge of the slit portion 90 refers to the slit end 100 disposed at the edge of the slit portion 90 away from a central line of the pixel electrode.

In some embodiments, the body portion 80 is the electrode of the pixel electrode itself. The body portion 80 includes a trunk electrode 801 and multiple branch electrodes 802 connected to the trunk electrode 801, and the branch electrodes 802 may be symmetrically disposed relative to the trunk electrode 801.

In some embodiments, the branch electrodes 802 may be misaligned relative to the trunk electrode 801.

It can be understood that the slit portion 90 is gaps between adjacent ones of the branch electrodes 802, and the slit end 100 is disposed in an edge region of the pixel electrode. Due to the fact that electric intensity in the region where the slit end 100 is located is weak, deflection of the liquid crystals at the slit end 100 is insufficient, resulting in a lower initial light transmittance of the slit end 100 compared to the body portion 80. Moreover, an initial light transmittance of the body portion 80 is less than an initial light transmittance of the slit portion 90.

In this embodiment, the initial light transmittance of the slit portion 90, the initial light transmittance of the body portion 80, and the initial light transmittance of the slit end 100 decrease sequentially. Correspondingly, a thickness of the alignment layers at the slit end 100, a thickness of the alignment layers at the body portion 80, and a thickness of the alignment layers at the slit portion 90 need to increase sequentially, so that a final light transmittance of the slit portion 90, a final light transmittance of the body portion 80, and a final light transmittance of the slit end 100 in each of the pixel electrodes tend to be the same, making the display brightness of the slit portion 90, the display brightness of the body portion 80, and the display brightness of the slit end 100 tend to be consistent, and improving the uniformity of the display brightness of any one of the pixel electrodes in different regions.

In some embodiments, a distance between the first alignment layer 30 and the second alignment layer 50 at the slit end 100, a distance between the first alignment layer 30 and the second alignment layer 50 at the body portion 80, and a distance between the first alignment layer 30 and the second alignment layer 50 at the slit portion 90 increase sequentially.

In some embodiments, any one of the pixel electrodes further includes the liquid crystal molecules 4 disposed close to the electric field and the liquid crystal molecules 4 disposed away from the electric field. Both of the thickness of the alignment layers at the liquid crystal molecules 4 that are disposed close to the electric field and the thickness of the alignment layers at the liquid crystal molecules 4 that are disposed away from the electric field are less than the thickness of the alignment layers in other regions of the pixel electrodes.

In some embodiments, the deflection of the liquid crystal molecules 4 close to the electric field is excessive, while the deflection of the liquid crystal molecule 4 away from the electric field is insufficient.

It can be understood that a strong electric field may lead to excessive liquid crystal deflection, and a weak electric field may lead to insufficient liquid crystal deflection, both of which can make the initial light transmittance of the region corresponding to the liquid crystal molecules 4 lower. By designing both of the sum of the thicknesses of the first alignment layer 30 and the second alignment layer 50 at the liquid crystal molecules 4 that are disposed close to the electric field, and the sum of the thicknesses of the first alignment layer 30 and the second alignment layer 50 at the liquid crystal molecules 4 that are disposed away from the electric field, being less than the sum of the thicknesses of the first alignment layer 30 and the second alignment layer 50 in other regions of the pixel electrodes, the present disclosure can adjust the display brightness of the region at the liquid crystal molecules 4 that are disposed close to the electric field and away from the electric field, improving the uniformity of the display brightness of each of the pixel electrodes in different regions.

In this embodiment, it can be judged that the liquid crystal molecules 4 have excessive or insufficient deflection based on the distance from the electric field. A smaller thickness of the alignment layers can be designed in the region with a low initial light transmittance to increase the display brightness of the region with the low initial light transmittance, improving the uniformity of the display brightness of each of the pixel electrodes in different regions.

In some embodiments, sums of the thicknesses of the first alignment layer 30 and the second alignment layer 50 corresponding to any two of the pixel electrodes with different initial light transmittance are not equal.

It can be understood that the initial light transmittance of different pixel electrodes may be different for adjacent pixel electrodes. By adjusting the thickness of the alignment layers corresponding to different pixel electrodes, specifically, by designing the thickness of the alignment layers corresponding to the pixel electrodes with a high initial light transmittance being larger, while the thickness of the alignment layers corresponding to the pixel electrodes with a low initial light transmittance being smaller, the uniformity of the display brightness of different pixel units can be improved.

In this embodiment, the thickness of the alignment layers is inversely proportional to the initial light transmittance by adjusting the thickness of the alignment layers corresponding to different pixel electrodes, making the display brightness corresponding to different pixel electrodes tend to be consistent, and further improving the uniformity of the display brightness of different pixel electrodes.

In some embodiments, any one of the pixel electrodes is provided with at least one of the first protrusions 60, and heights of the first protrusions 60 respectively corresponding to the pixel electrodes with different initial light transmittance are different.

It can be understood that the first protrusions 60 corresponding to each of the pixel electrodes can be used to adjust the thickness of the alignment layers of each of the pixel electrodes in different regions, so as to realize the improvement of the uniformity of the display brightness of any one of the pixel electrodes in different regions.

It can be understood that the first protrusions 60 with different heights can be disposed opposite to different pixel electrodes, so as to achieve different thicknesses of the alignment layers at different pixel electrodes, thereby improving the uniformity of the display brightness of different pixel electrodes.

It should be noted that, this embodiment mainly adjusts the thickness of the alignment layers through the first protrusions 60 of the array substrate 2, and the second alignment layer 50 can have a uniform thickness. In some embodiments, the color film substrate 3 may further include multiple second protrusions 70 disposed between the second substrate 40 and the second alignment layer 50 at intervals. The second protrusions 70 are mainly used to adjust a deflection angle of the liquid crystal molecules 4, thereby achieving a shorter response time of the liquid crystal molecules 4 at the second protrusions 70.

In this embodiment, any one of the pixel electrodes is provided with at least one of the first protrusions 60 opposite to each other, and the heights of the first protrusions 60 corresponding to different pixel electrodes with different initial light transmittance are different. With the above-mentioned design, the uniformity of the display brightness of any one of the pixel electrodes in different regions can be improved, moreover, the uniformity of the display brightness of different pixel electrodes can further be improved.

Referring to FIG. 2, in some embodiments, a second groove is formed between any adjacent two of the second protrusions 70. A thickness d2 of the second alignment layer 50 at the second protrusions 70 is less than a thickness d4 of the second alignment layer 50 at the second grooves.

In some embodiments, a material of the preparation of the second alignment layer 50 may be the same as the material of the preparation of the first alignment layer 30.

In some embodiments, the material of the preparation of the second alignment layer 50 may be polyimide.

It can be understood that the thickness of the second alignment layer 50 can be adjusted through the second protrusions 70 and the second grooves, and in combination with the design that the thickness of the first alignment layer 30 can be adjusted through the first protrusions 60 and the first grooves, the adjustment to the thickness of the alignment layers in different regions can be achieved.

It should be noted that only the second protrusions 70 disposed in the color filter substrate 3 can affect the deflection angle of the liquid crystal molecules 4 in some embodiments. Specifically, the second protrusions 70 can make the liquid crystal molecules 4 have a larger deflection angle to improve the response time of the liquid crystals, achieving the multi-domain vertical alignment (MVA) technology.

In this embodiment, by designing the second protrusions 70 being disposed at intervals and the multiple second grooves in the color filter substrate 3, the thickness of the second alignment layer 50 at the second protrusions 70 and the second grooves can be adjusted to adjust the thickness of the alignment layers in different regions. Moreover, it can also make the liquid crystal molecules 4 at the second protrusions 70 have a larger deflection angle, thereby shortening the time for the liquid crystal molecules 4 to change to a horizontal state, reducing the penetration time of the backlight, and improving the penetration speed of the backlight.

In some embodiments, the second protrusions 70 are an independent component.

It can be understood that the second protrusions 70 can be prepared by using an additional photomask, and the second protrusions 70 can be disposed on a surface of any film layer above the second substrate 40.

Referring to FIG. 1, in some embodiments, in the film thickness direction, the second protrusions 70 may be disposed in misalignment with the first protrusions 60, and the second protrusions 70 and the first protrusions 60 are disposed in a region with a lower initial light transmittance.

In the structure shown in FIG. 1, a first thickness d1 is the thickness of the first alignment layer 30 in the second region 120, a second thickness d2 is the thickness of the second alignment layer 50 in the second region 120, a third thickness d3 is the thickness of the first alignment layer 30 in the first region 110, and a fourth thickness d4 is the thickness of the second alignment layer 50 in the first region 110. In some embodiments, the first thickness d1, the second thickness d2, the third thickness d3, and the fourth thickness d4 satisfy the following equations: $d1<d3$, and $d2<d4$.

In some embodiments, each of the first grooves may be disposed in misalignment with each of the second grooves, and the first grooves and the second grooves are disposed in a region with a higher initial light transmittance.

It can be understood that a height of the first protrusions 60 is less than a height of the second protrusions 70 when a depth of the first grooves is greater than a depth of the second grooves. The display brightness of the regions respectively at the first protrusions 60 and the second protrusions 70 tend to be consistent by designing the second protrusions 70 being disposed in alignment with the first grooves, and the first protrusions 60 being disposed in alignment with the second grooves.

In this embodiment, the second protrusions 70 can be disposed in alignment with the first grooves, and the first protrusions 60 can be disposed in alignment with the second grooves by designing the second protrusions 70 being disposed in misalignment with the first protrusions 60, so that luminous brightness of the regions at the first protrusions 60 and the second protrusions 70 tend to be consistent.

Referring to FIG. 2, in some embodiments, the second protrusions 70 is disposed opposite to the first protrusions 60 in the film thickness direction.

In the structure shown in FIG. 2, a first thickness d1 is the thickness of the first alignment layer 30 in the second region 120, a second thickness d2 is the thickness of the second alignment layer 50 in the second region 120, a third thickness d3 is the thickness of the first alignment layer 30 in the first region 110, and a fourth thickness d4 is the thickness of the second alignment layer 50 in the first region 110. In some embodiments, the first thickness d1, the second thickness d2, the third thickness d3, and the fourth thickness d4 satisfy the following equations: $d1+d4<d3+d4$, and $d2+d3<d3+d4$.

It can be understood that the initial light transmittance of the region at the second protrusions 70 is low because of the low liquid crystal penetration rate of the region where the second protrusions 70 are located. Therefore, the thickness of the alignment layers that needs to be designed at the second protrusions 70 is relatively small. Based on the above, a small thickness of the alignment layers at the second protrusions 70 can be achieved by designing the first protrusions 60 being opposite to the second protrusions 70, so that the display brightness of the region where the second protrusions 70 are located tends to be consistent with the display brightness of other regions, improving the uniformity of the display brightness of the liquid crystal display panel 1.

Referring to FIG. 1 and FIG. 2, in some embodiments, the liquid crystal molecules 4 which are disposed in alignment with the second protrusions 70 have a first deflection angle $\alpha 1$, and the liquid crystal molecules 4 in other regions where the second protrusions 70 are not provided are in an upright static state or have a second deflection angle $\alpha 2$, and the first deflection angle $\alpha 1$ is greater than the second deflection angle $\alpha 2$.

It can be understood that an angle through which the liquid crystal molecules 4 change from the first deflection angle $\alpha 1$ to the horizontal state is less than an angle through which the liquid crystal molecules 4 change from the second deflection angle $\alpha 2$ to the horizontal state. Therefore, the time required for the liquid crystal molecules 4 from being at the first deflection angle $\alpha 1$ to change to the horizontal state can be shortened.

It should be noted that the first deflection angle $\alpha 1$ is the angle through which the liquid crystal molecules 4 turn from the upright static state to the first deflection angle $\alpha 1$, and the second deflection angle $\alpha 2$ is the angle through which the liquid crystal molecules 4 turn from the upright static state to the second deflection angle $\alpha 2$.

In this embodiment, the liquid crystal molecules 4 at the second protrusions 70 have a larger deflection angle by designing the second protrusions 70 in the color filter substrate 3, thereby shortening the time for the liquid crystal molecules 4 to change to the horizontal state, reducing the penetration time of the backlight, and further increasing the penetration speed of the backlight.

Embodiments of the present disclosure further provide a display module and/or a display device. Both the display module and the display device include the above-mentioned liquid crystal display panel, which will not be repeated here.

The liquid crystal display panel provided in the embodiments includes the array substrate, the color filter substrate, and the liquid crystal molecules disposed between the array substrate and the color filter substrate. The array substrate includes the first substrate and the first alignment layer disposed on the side of the first substrate facing the color filter substrate. The color filter substrate includes the second substrate and the second alignment layer disposed on the side of the second substrate facing the array substrate. The liquid crystal display panel has at least a first region and a second region, and the initial light transmittance of the first region is greater than the initial light transmittance of the second region. In the film thickness direction, the sum of the thicknesses of the first alignment layer and the second alignment layer in the first region is greater than the sum of the thicknesses of the first alignment layer and the second alignment layer in the second region, so that the final light transmittance of the first region and the final light transmittance of the second region tend to be consistent. By designing the alignment layer with different thicknesses in the regions with different initial light transmittance, specifically, by designing the thickness of the alignment layers in the first region with the high initial light transmittance being greater than the thickness of the alignment layers in the second region with the low initial light transmittance, so that the final light transmittance of different regions tend to be consistent, which in turn makes the display brightness of different regions tend to be consistent, improving the uniformity of the display brightness of different regions.

In the foregoing embodiments, the descriptions of each embodiment have their own emphases, and for parts not described in detail in a certain embodiment, reference may be made to relevant descriptions of other embodiments.

The present disclosure has been described in detail with respect to liquid crystal display panel of the present disclosure. The principles and implementations of the present disclosure are described in detail here with specific examples. The above description of the embodiments is merely intended to help understand the method and core ideas of the present disclosure. At the same time, a person skilled in the art may make changes in the specific embodiments and disclosure scope according to the idea of the present disclosure. In conclusion, the content of the present specification should not be construed as a limitation to the present disclosure.

What is claimed is:

1. A liquid crystal display panel, comprising at least a first region and a second region, wherein the liquid crystal display panel comprises:
   an array substrate comprising a first substrate, a first alignment layer disposed on a side of the first substrate, and a pixel electrode layer comprising a plurality of pixel electrodes;
   a color filter substrate comprising a second substrate and a second alignment layer disposed on a side of the second substrate facing the array substrate, wherein the second alignment layer is disposed opposite to the first alignment layer; and
   liquid crystal molecules disposed between the array substrate and the color filter substrate;
   wherein in a film thickness direction, a sum of a thickness of the first alignment layer and a thickness of the second alignment layer in the first region is greater than a sum of a thickness of the first alignment layer and a thickness of the second alignment layer in the second region;
   a plurality of first protrusions are disposed on the pixel electrode layer at intervals, any one of the pixel electrodes is disposed opposite to at least one of the first protrusions, and different pixel electrodes have different first protrusions with different heights that correspond to a transmittance of a pixel region; and
   each of the pixel electrodes comprises a body portion, a slit portion disposed in the body portion, and a slit end disposed at a peripheral edge of the body portion and a peripheral edge of the slit portion; and a sum of a thickness of the first alignment layer and a thickness of the second alignment layer at the slit end, a sum of a thickness of the first alignment layer and a thickness of the second alignment layer at the body portion, and a sum of a thickness of the first alignment layer and a thickness of the second alignment layer at the slit portion decrease sequentially.

2. The liquid crystal display panel of claim 1, wherein a first groove is formed between any adjacent two of the first protrusions; wherein a thickness of the first alignment layer at the first protrusions is less than a thickness of the first alignment layer at the first grooves.

3. The liquid crystal display panel of claim 2, wherein the first protrusions are disposed in the second region, and a plurality of the first grooves are disposed in the first region.

4. The liquid crystal display panel of claim 3, wherein the first protrusions are integrated with the pixel electrode layer, and a material of the first protrusions and a material of the pixel electrode layer are same.

5. The liquid crystal display panel of claim 2, wherein each of the pixel electrodes comprises a body portion, a slit portion disposed in the body portion, and a slit end disposed at a peripheral edge of the body portion and a peripheral edge of the slit portion; wherein a distance between the first alignment layer and the second alignment layer at the slit end, a distance between the first alignment layer and the second alignment layer at the body portion, and a distance between the first alignment layer and the second alignment layer at the slit portion increase sequentially.

6. The liquid crystal display panel of claim 1, wherein the color filter substrate further comprises a plurality of second protrusions disposed at intervals, and a second groove is formed between any adjacent two of the second protrusions; wherein a thickness of the second alignment layer at the second protrusions is less than a thickness of the second alignment layer at the second grooves.

7. The liquid crystal display panel of claim 1, wherein the first protrusions are disposed between the first substrate and the first alignment layer, and a first groove is formed between any adjacent two of the first protrusions; wherein a thickness of the first alignment layer at the first protrusions is less than a thickness of the first alignment layer at the first grooves; and the color filter substrate further comprises a plurality of second protrusions disposed at intervals, the second protrusions are disposed between the second substrate and the second alignment layer, and a second groove is formed between any adjacent two of the second protrusions; wherein a thickness of the second alignment layer at the second protrusions is less than a thickness of the second alignment layer at the second grooves; and wherein the second protrusions are disposed in misalignment with the first protrusions in the film thickness direction.

8. The liquid crystal display panel of claim 6, wherein the liquid crystal molecules disposed in alignment with the second protrusions have a first deflection angle, and the liquid crystal molecules disposed in other regions without the second protrusions are in an upright static state or have a second deflection angle, wherein the first deflection angle is greater than the second deflection angle.

9. The liquid crystal display panel of claim 6, wherein the second protrusions are disposed in the second region, and a plurality of the second grooves are disposed in the first region.

10. The liquid crystal display panel of claim 1, wherein the first protrusions are disposed between the first substrate and the first alignment layer, and a first groove is formed between any adjacent two of the first protrusions; wherein a thickness of the first alignment layer at the first protrusions is less than a thickness of the first alignment layer at the first grooves; and the color filter substrate further comprises a plurality of second protrusions disposed at intervals, the second protrusions are disposed between the second substrate and the second alignment layer, and a second groove is formed between any adjacent two of the second protrusions; wherein a thickness of the second alignment layer at the second protrusions is less than a thickness of the second alignment layer at the second grooves; and wherein the second protrusions are disposed opposite to the first protrusions in the film thickness direction.

11. The liquid crystal display panel of claim 1, wherein the first protrusions are disposed between the first substrate and the first alignment layer, and a first groove is formed between any adjacent two of the first protrusions; wherein a thickness of the first alignment layer at the first protrusions is less than a thickness of the first alignment layer at the first grooves; and the color filter substrate further comprises a plurality of second protrusions disposed at intervals, the second protrusions are disposed between the second substrate and the second alignment layer, and a second groove is formed between any adjacent two of the second protrusions; wherein a thickness of the second alignment layer at the second protrusions is equal to a thickness of the second alignment layer at the second grooves.

12. A liquid crystal display device, comprising a liquid crystal display panel having a first region and a second region, wherein the liquid crystal display panel comprises:

an array substrate comprising a first substrate, a first alignment layer disposed on a side of the first substrate, and a pixel electrode layer comprising a plurality of pixel electrodes;

a color filter substrate comprising a second substrate and a second alignment layer disposed on a side of the second substrate facing the array substrate, wherein the second alignment layer is disposed opposite to the first alignment layer; and liquid crystal molecules disposed between the array substrate and the color filter substrate;

wherein in a film thickness direction, a sum of a thickness of the first alignment layer and a thickness of the second alignment layer in the first region is greater than a sum of a thickness of the first alignment layer and a thickness of the second alignment layer in the second region;

a plurality of first protrusions are disposed on the pixel electrode layer at intervals, any one of the pixel electrodes is disposed opposite to at least one of the first protrusions, and different pixel electrodes have different first protrusions with different heights that correspond to a transmittance of a pixel region; and each of the pixel electrodes comprises a body portion, a slit portion disposed in the body portion, and a slit end disposed at a peripheral edge of the body portion and a peripheral edge of the slit portion; and a sum of a thickness of the first alignment layer and a thickness of the second alignment layer at the slit end, a sum of a thickness of the first alignment layer and a thickness of the second alignment layer at the body portion, and a sum of a thickness of the first alignment layer and a thickness of the second alignment layer at the slit portion decrease sequentially.

13. The liquid crystal display device of claim 12, wherein a first groove is formed between any adjacent two of the first protrusions; wherein a thickness of the first alignment layer at the first protrusions is less than a thickness of the first alignment layer at the first grooves.

14. The liquid crystal display device of claim 13, wherein the first protrusions are disposed in the second region, and a plurality of the first grooves are disposed in the first region.

15. The liquid crystal display device of claim 12, wherein the color filter substrate further comprises a plurality of second protrusions disposed at intervals, and a second groove is formed between any adjacent two of the second protrusions; wherein a thickness of the second alignment layer at the second protrusions is less than a thickness of the second alignment layer at the second grooves.

16. The liquid crystal display device of claim 12, wherein the first protrusions are disposed between the first substrate and the first alignment layer, and a first groove is formed between any adjacent two of the first protrusions; wherein a thickness of the first alignment layer at the first protrusions is less than a thickness of the first alignment layer at the first grooves; and the color filter substrate further comprises a plurality of second protrusions disposed at intervals, and a second groove is formed between any adjacent two of the second protrusions; wherein a thickness of the second alignment layer at the second protrusions is less than a thickness of the second alignment layer at the second grooves; and wherein in the film thickness direction, the second protrusions are disposed in misalignment with the first protrusions, or the second protrusions are disposed opposite to the first protrusions.

17. A liquid crystal display panel, comprising at least a first region and a second region, wherein the liquid crystal display panel comprises:

an array substrate comprising a first substrate, a first alignment layer disposed on a side of the first substrate, and a plurality of pixel electrodes, wherein each of the pixel electrodes comprises a body portion, a slit portion disposed in the body portion, and a slit end disposed at a peripheral edge of the body portion and a peripheral edge of the slit portion;

a color filter substrate comprising a second substrate and a second alignment layer disposed on a side of the second substrate facing the array substrate, wherein the second alignment layer is disposed opposite to the first alignment layer; and liquid crystal molecules disposed between the array substrate and the color filter substrate;

wherein in a film thickness direction, a sum of a thickness of the first alignment layer and a thickness of the second alignment layer in the first region is greater than a sum of a thickness of the first alignment layer and a thickness of the second alignment layer in the second region; and wherein a sum of a thickness of the first alignment layer and a thickness of the second alignment layer at the slit end, a sum of a thickness of the first alignment layer and a thickness of the second alignment layer at the body portion, and a sum of a thickness of the first alignment layer and a thickness of the second alignment layer at the slit portion decrease sequentially.

* * * * *